(12) United States Patent
Bitter et al.

(10) Patent No.: US 8,646,852 B2
(45) Date of Patent: Feb. 11, 2014

(54) HYDRAULIC BRAKING ARRANGEMENT FOR A TRAILER

(75) Inventors: Marcus Bitter, Mannheim (DE); Andreas Remmelmann, Karlstein (DE)

(73) Assignee: Deere & Company, Moline, IL (US)

( * ) Notice: Subject to any disclaimer, the term of this patent is extended or adjusted under 35 U.S.C. 154(b) by 1978 days.

(21) Appl. No.: 11/674,715

(22) Filed: Feb. 14, 2007

(65) Prior Publication Data

US 2007/0205656 A1 Sep. 6, 2007

(30) Foreign Application Priority Data

Feb. 18, 2006 (DE) .......................... 10 2006 007 575

(51) Int. Cl.
*B60T 13/00* (2006.01)

(52) U.S. Cl.
USPC .............................................. 303/7; 303/123

(58) Field of Classification Search
USPC .................................... 303/7, 123, 10, 13, 15
See application file for complete search history.

(56) References Cited

U.S. PATENT DOCUMENTS

| | | | | |
|---|---|---|---|---|
| 3,543,512 | A | * | 12/1970 | England et al. ................. 60/404 |
| 3,690,734 | A | * | 9/1972 | Van Dest ........................... 303/7 |
| 4,343,517 | A | * | 8/1982 | Levington ......................... 303/7 |
| 6,729,696 | B2 | * | 5/2004 | Kemer et al. ..................... 303/7 |

FOREIGN PATENT DOCUMENTS

| | | |
|---|---|---|
| DE | 28 25 847 | 12/1979 |
| EP | 0 072 951 | 3/1983 |
| EP | 1 538 044 | 6/2005 |
| FR | 2 420 463 | 10/1979 |
| FR | 2 496 577 | 6/1982 |
| GB | 911 096 | 11/1962 |

OTHER PUBLICATIONS

European Search Report, May 20, 2008, 4 pages.

* cited by examiner

*Primary Examiner* — Bradley King
*Assistant Examiner* — Stephen Bowes

(57) ABSTRACT

A hydraulic arrangement for braking a trailer comprises a brake line connected between a brake system of a trailer and a trailer brake valve. The trailer brake valve is activated via a first control-pressure line which extends between the brake line and the trailer brake valve and via a second control-pressure line which extends between the trailer brake valve and a control-pressure source and acts in opposition to the pressure imposed on the trailer brake valve by the first control-pressure line. An adjustable pressure-reducing means for controlling the control pressure in the second control-pressure line is arranged in the second control-pressure line. It is proposed to design the control-pressure source as part of a hydraulic control of a brake system of a traction vehicle drawing the trailer and to force the pressure-reducing means mechanically into an open basic position by means of an adjustable prestressing force.

10 Claims, 8 Drawing Sheets

HYDRAULIC BRAKING ARRANGEMENT FOR A TRAILER

FIELD OF THE INVENTION

The invention relates to a hydraulic arrangement for braking a trailer with a brake line connectable hydraulically to a brake system of a trailer, with a hydraulic source, with a hydraulic tank, with a hydraulically actuatable trailer brake valve connecting the hydraulic source and the tank to the brake line, with a first control-pressure line extending between the brake line and the trailer brake valve, with a second control-pressure line extending between the trailer brake valve and a control-pressure source, and with an adjustable pressure-reducing means, arranged in the second control-pressure line, for controlling the control pressure.

BACKGROUND OF THE INVENTION

In traction vehicles with one or more trailers, special stipulations as regards the brake system of the trailer have to be adhered to, particularly when the trailer has hydraulic brake systems. The stipulations and directives for hydraulic trailer brake systems are different from state to state, and because of this the brake systems have to be designed so as to be as variably adjustable as possible, in order to satisfy the various requirements and so that they can be used as universally as possible. Particularly where ensuring a maximum trailer brake pressure is concerned, different standards are applied in Europe. In this case, in most European countries, the maximum trailer brake pressure under the full braking of the traction vehicle must lie between 100 and 150 bar. In France, the maximum trailer brake pressure under the full braking of a traction vehicle must lie even between 120 and 150 bar. Furthermore, when the brake of the traction vehicle is not actuated, no brake pressure should prevail on the trailer. In addition, for example in France, a pressure of 100 bar must prevail on the trailer when the traction vehicle is braked with a deceleration of 25% to 35%. This gives rise to some fundamental problems which are listed below: a non-loaded trailer is braked to a greater extent than a loaded trailer if the brake pressure is the same. Overbraking or underbraking of a trailer and consequently a jackknifing of the entire tractor-trailer may therefore take place. A non-loaded traction vehicle is braked to a greater extent than a loaded traction vehicle if the brake pressure is the same. Here, too, overbraking or underbraking of the trailer and consequently a jackknifing of the entire tractor-trailer may therefore take place. With the brake pressure being the same, large tire diameters generate a lower deceleration force than small tire diameters. This also applies to new and worn tires. In view of these problems, it is difficult to find a correct coordination of the hydraulic trailer brake valve for an entire tractor-trailer.

In the prior art, matching valves, as they may be referred to, which limit the maximum brake pressure on the trailer, are known. Issue No. 8, 2005, pages 54 and 55 of the specialist journal "PROFI" discloses, for example, a hydraulic arrangement for a brake system of the company Paul Forrer AG, in which a variable brake pressure for the trailer can be set via a load-matching valve in the brake line of the trailer, so that the braking behavior can be matched to the different loading states of the trailer. The disadvantage, here, is that the setting of the load-holding valve has to take place manually outside a cab of the traction vehicle. Moreover, this solution entails considerable power losses, since a brake pressure already generated in the brake line is subsequently limited and the remaining brake-pressure excess is therefore squandered.

The object on which the invention is based is seen in specifying a hydraulic arrangement of the type mentioned in the introduction, by means of which the abovementioned problems are overcome.

SUMMARY OF THE INVENTION

According to the present invention, there is provided an improved hydraulic arrangement for controlling trailer brakes.

Specifically, according to the invention, a hydraulic arrangement of the type mentioned in the introduction comprises a control-pressure source which is designed as part of the hydraulic circuit of a brake system of a traction vehicle drawing the trailer, the pressure-reducing means being capable of being forced mechanically into an open basic position by means of an adjustable prestressing force. Since the control-pressure source is designed as part of the hydraulic circuit of the brake system of the traction, vehicle, a control pressure can be generated in the second control-pressure line by generating a brake pressure in the traction vehicle, for example by depressing the brake pedal. At the same time, the pressure-reducing means is in an open basic position, so that even in the event of the failure of an electronic control on the traction vehicle, the functionality of the hydraulic brake system for the trailer is ensured. Furthermore, by the pressure-reducing means being arranged in the second control-pressure line, a limitation of the brake pressure for the brake system of the trailer does not take place only in the brake line, that is to say in a large-volume line, but even in the second control line for the trailer brake valve, that is to say in a small-volume line, so that power losses can be minimized.

The control-pressure source may be designed, for example, as a hydraulic line connected to the brake system of the traction vehicle. The result of this is that the second control-pressure line can be branched off directly from the brake line, so that, whenever a pressure is built up in the brake line of the traction vehicle, a control pressure for controlling the trailer brake valve prevails. The control-pressure line may in this case be branched off directly or connected indirectly, for example via a connection part or a valve, to the brake line or another line, carrying a brake pressure or a pressure, of the brake system of the traction vehicle.

The pressure-reducing means in the second control-pressure line is designed as an adjustable hydraulically switchable pressure-reducing valve. In this case, the pressure-reducing valve is designed in such a way that the prestressing force can be adjusted or set by an operator, whether by manual, electrical or hydraulic means, at the same time always ensuring that a preset prestressing force acts independently of hydraulic or electrical means. The pressure-reducing valve can be brought into a closing position via a pilot-pressure line which leads from the second control-pressure line to the pressure-reducing valve on the same side as the trailer brake valve, provided that the pressure, prevailing in the control-pressure line overcomes the preset prestressing force. Thus, should a control pressure which overshoots the preset value be set in the second control-pressure line, the pressure-reducing valve is brought into the closing position. The trailer brake valve can therefore be activated variably, up to a preset pressure for the second control-pressure line, according to the pressure generated by the brake system for the traction vehicle or to the pressure generated by the control-pressure source.

A bypass line, which is connected in parallel, to the pressure-reducing valve, makes it possible to arrange a non-return valve which is closed in the direction of the trailer brake valve and by means of which a backflow of hydraulic fluid out of the second control-pressure line is simplified or accelerated.

The pressure-reducing valve may be designed as a conventional pressure-reducing valve, which closes the second control-pressure line beyond a defined control pressure in the second control-pressure line, or else as a switching valve which, beyond a defined pressure in the brake line, closes the second control-pressure line in both directions or at least in the direction of the trailer brake valve. Where the switching valve is concerned, this is connected to the brake line of the trailer via a pilot-pressure line, so that the switching valve closes by hydraulic activation when a maximum brake pressure is reached.

The pressure-reducing valve preferably has an adjustable prestressing spring, by means of which the prestressing force which forces the pressure-reducing valve into an open basic position is generated. The prestressing spring may in this case be adjusted by an operator manually or electrically. The prestressing force of the adjusting spring stipulates, in purely mechanical terms, at which maximum pressure the pressure-reducing valve is to close, so that, even, in the event of the failure of electronics controlling the brake system of the trailer or of the traction vehicle or components of these, a brake pressure braking, the trailer and branched off from the brake system of the traction vehicle is built up. By the prestressing spring being adjusted, the setting of a maximum brake pressure for the trailer takes place. As a result, the control pressure in the control-pressure line, which activates the trailer brake valve, can be set at a defined maximum pressure which, in accordance with the directives referred to above, should, for example, not undershoot 100 bar (120 bar in France) and not overshoot 150 bar.

The pressure-reducing valve may have electronic adjustment means which make it possible to generate an actuating force which counteracts or reinforces the prestressing force of the prestressing spring. Electronic adjustment means of this type may be designed, for example, as magnet coils which influence, that is to say increase or decrease, a deflection of the prestressing spring. In these instances, the prestressing spring must be set to an extent such that, in the event of the failure of electrics, the regulations mentioned in the introduction are, as before, fulfilled. Here, too, therefore, the maximum trailer brake pressure should not undershoot 100 bar (120 bar in France) and not overshoot 150 bar. If the spring is set at 100 bar (120 bar in France), a higher hydraulic pressure can be built up with an increasing electrical control signal. In order to switch the pressure-reducing valve which, as mentioned above, may be designed as a pressure-reducing valve or as a switching valve. The prestressing spring may in this case be electronically reinforced proportionally by up to 50 bar.

If the spring is set at 150 bar, a lower hydraulic pressure has to be built up with an increasing electronic control signal in order to switch the pressure-reducing valve. The prestressing spring may in this case be electronically relieved proportionally by up to 50 bar. In the event of a failure of the electrics, the trailer would still be capable of being braked, and in this case the maximum pressure could amount either to 100 bar (120 bar in France) or to 150 bar. Even when switching valves are used instead of pressure-reducing valves as pressure-reducing valves, electronic adjustments or activations of the prestressing spring may be employed, so that the same electronic means have a reinforcing or relieving action, so that, in the event of failure of the electrics, the trailer can be braked with max, 100 bar or 150 bar. In this case, here, the control pressure acting in the second control-pressure line is not critical, but, instead, the pressure acting in the brake line for the trailer, as described above.

The trailer brake valve may be designed as a proportional slide valve which can be activated hydraulically by the first control-pressure line from the brake line of the trailer and hydraulically by the second control-pressure line from the brake system of the traction vehicle. The trailer brake valve is in this case designed such that, with the control pressure in the second control-pressure line becoming higher, the slide is displaced proportionally or opens increasingly, so that a higher brake pressure is established due to the hydraulic fluid conveyed from the hydraulic source. In this case, an equilibrium is established, at maximum brake pressure, for the trailer, since the pressure from the brake line in the first control-pressure line counteracts the pressure in the second control-pressure line. If, by contrast, the second control-pressure is not acted upon with pressure, that is to say the brake system of the traction vehicle is not actuated, so that no control pressure builds up any further, the slide valve is moved in the opposite direction and the pressure decreases via the slide valve, in that the hydraulic fluid previously conveyed can flow out in the direction of the hydraulic tank.

A third control-pressure line may be provided, by means of which the trailer brake valve can be activated hydraulically in addition to the first and the second control-pressure line. The third control-pressure line is in this case preferably provided with an electronically adjustable pressure-reducing valve which connects the hydraulic source and the hydraulic tank to the third control-pressure line. The additional activation of the trailer brake valve may be utilized for changing the characteristic map of the trailer brake valve, so that, by an additional control pressure being applied, the braking behavior of the trailer can be organized in a flexible way. The arrangement of the third control-pressure line in this case takes place preferably parallel to the second control-pressure line. Furthermore, what is essential in this exemplary embodiment is, in the first place, the limitation of the maximum trailer brake pressure by the maximum control pressure in the second control-pressure line to a value of 100 bar or 120 bar, as explained above. The limiting pressure may in this case be set permanently and not be adjustable electronically, apart from the difference of 100 bar and 120 bar. The braking behavior or the behavior of the slide valve is thereby designed in such a way that the vehicle, together with its trailer, can be braked in its most unfavorable state in terms of French regulations. This basic setting of the control signal by means of the control pressure in the second control-pressure line on the trailer brake valve slide, then, has superposed on it the control pressure of the third control-pressure line which is set by means of the electroproportional pressure-reducing valve arranged between the third control-pressure line and the hydraulic source or hydraulic tank. Owing to the additional third control pressure, the slide valve can be deflected to a greater extent and, consequently, a higher braking action can be achieved. A superposition of the two pressures thus takes place, and it is possible to vary the characteristic map of the trailer brake valve freely within predetermined limits and thus set the braking behavior of the entire tractor-trailer positively in terms of driving behavior.

In further exemplary embodiments, a pressure sensor is provided, by means of which the pressure of the brake system of the traction vehicle can be determined. The pressure, measured by means of the pressure sensor, in the brake system of the traction vehicle can then be utilized, for the further processing and optimization of the hydraulic arrangement.

A pressure sensor may be provided which is arranged in the brake line of the trailer, this not being absolutely necessary for the functioning of the hydraulic arrangement, although a more accurate setting or regulation of the trailer brake pressure can be achieved. The advantage would be tantamount to a closed loop, in which the initial pressure of the hydraulic arrangement or the trailer brake pressure is monitored continuously and a closed-loop control provided is thereby improved.

An electronic control unit for controlling or regulating electronically adjustable or switchable valves and for processing electronic sensor signals in this case evaluates the pressure, measured by the pressure sensor or pressure sensors, in the brake system of the traction vehicle and, by means of the characteristic curve provided by the operator for the trailer brake valve, calculates the control pressure which is to be generated by the pressure-reducing valve in the third control-pressure line and which then deflects the trailer brake valve slide further than would be possible solely by the control pressure generated in the second control-pressure line by the brake signal of the brake system of the traction vehicle. A superposition of the control pressures in the second and the third control-pressure line thus takes place. It is therefore possible to vary the characteristic map of the trailer brake valve freely within predetermined limits and thus set the braking behavior of the entire tractor-trailer positively in terms of the driving behavior. It is thus also conceivable to store in the electronic control a specific intelligence which, for example with reference to the rate of pressure rise in the traction vehicle, detects whether this relates to emergency braking, so as then to brake the trailer substantially more quickly and more strongly than normal. The pressure generated by the hydraulic source may be employed, throttled or unthrottled, as required, as the supply pressure of the electrical pressure-reducing value in the third control-pressure line. This is advantageous for structural reasons, since this pressure is required as supply pressure for the brake system of the trailer and therefore a more compact type of construction becomes possible.

A hydraulic arrangement according to the invention is particularly suitable for a combination of a trailer and traction vehicle in agriculture, a hydraulic brake system being provided for the trailer and a hydraulic brake system being provided for the traction vehicle. Other fields of use may also be envisaged, however, in which a combination of a traction vehicle and trailer with hydraulic brake systems are used and a hydraulic arrangement according to the invention may be employed, for example in the sector of commercial vehicles or even in the sector of passenger cars.

The advantages of the invention are, in particular, that it is possible for an operator to take into account the loading state of his trailer by means of a simple adjustment for braking his entire vehicle combination. Furthermore, from the cab, he can adjust his maximum trailer brake pressure and thus optimize the braking behavior of his entire vehicle combination during travel. Furthermore, from the cab, he can adapt the characteristic map of his trailer brake valve to the respective tyre size and overall weight of his traction vehicle. If there is no trailer being operated, energy can be saved during normal operation, since the characteristic curve can be set to its minimal maximum pressure. Should a failure of the electrics occur, the tractor-trailer can still always be braked in a controlled way.

BRIEF DESCRIPTION OF THE DRAWING

The invention and also further advantages and advantageous developments and refinements of the invention are described and explained in more detail below with reference to the drawing which shows an exemplary embodiment of the invention.

DESCRIPTION OF THE PREFERRED EMBODIMENT

Figure 1:
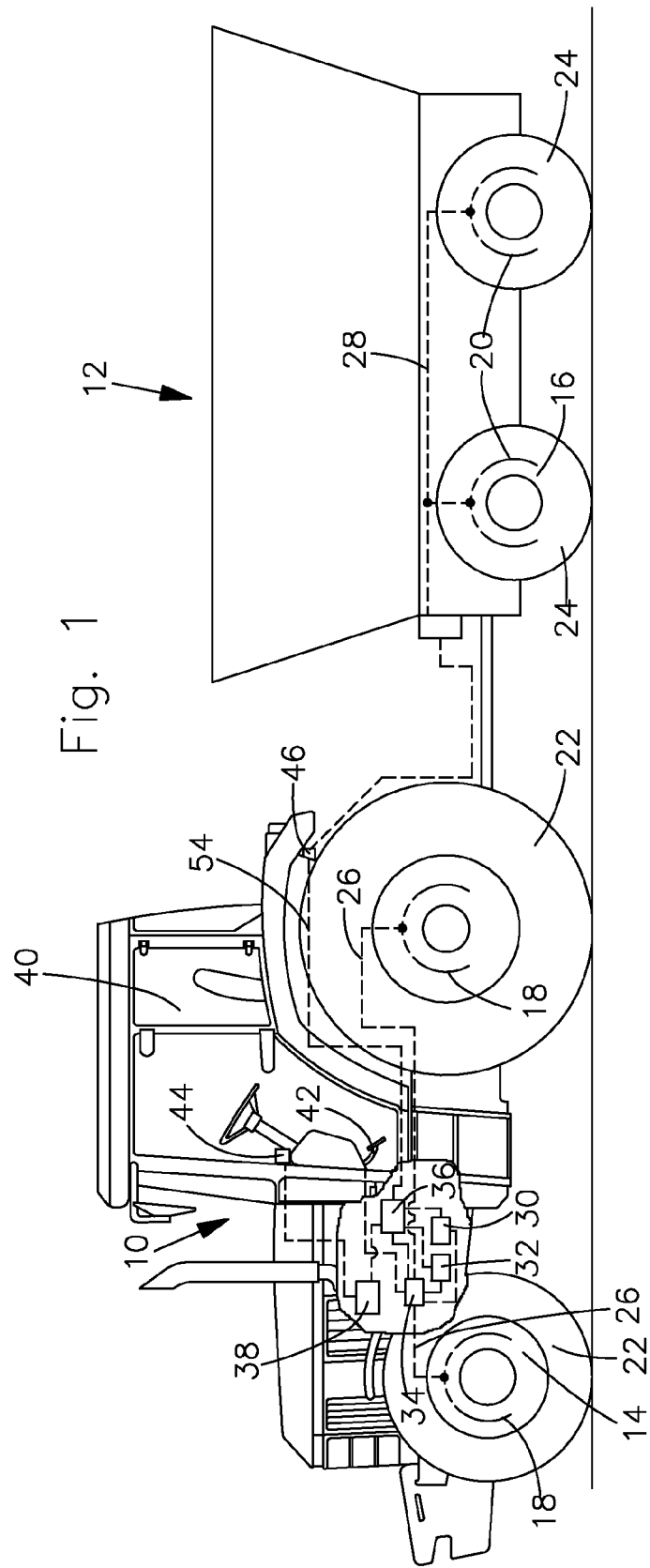
FIG. 1 shows a combination of a traction vehicle and trailer with a hydraulic arrangement according to the invention.

FIG. 1 shows a combination of a traction vehicle 10, in the form of an agricultural tractor, and a trailer 12. The traction vehicle 10 and the trailer 12 have in each case a hydraulically actuable brake system 14, 16, the supply and control components for the brake systems 14, 16 being arranged predominantly on the fraction vehicle 10.

The brake systems 14, 16 have hydraulically actuable braking means 18, 20 which are designed as brake shoes capable of being brought into engagement with wheels 22 of the traction vehicle 10 and with wheels 24 of the trailer 12. The actuation of the braking means 18, 20 takes place by the hydraulic action of pressure upon corresponding brake lines 26, 28.

The supply and control components for the brake systems 14, 16 comprise a hydraulic tank 30, a hydraulic pump 32, a hydraulic control 34 for the brake system 14 of the traction vehicle 10, a hydraulic control 36 for the trailer 12 and an electronic control 38 for the electronically activatable components of the hydraulic controls 36 for the traction vehicle 10 or the trailer 12. In a vehicle cab 40 of the traction vehicle 10 are arranged a brake pedal 42 triggering the brake pressure and connected to the hydraulic control 34 of the brake system 14, and also an electronic setting device 44 by means of which control signals to the electronic control 38 can be generated. The brake system 16 of the trailer 12 is connected hydraulically to the brake system 14 of the traction vehicle 10 via a hydraulic coupling point 46 arranged on the traction vehicle 10.

The arrangement and design of the hydraulic control 36 for the trailer 12 are explained with reference to the exemplary embodiments illustrated in FIGS. 2 to 10.

Figure 2:
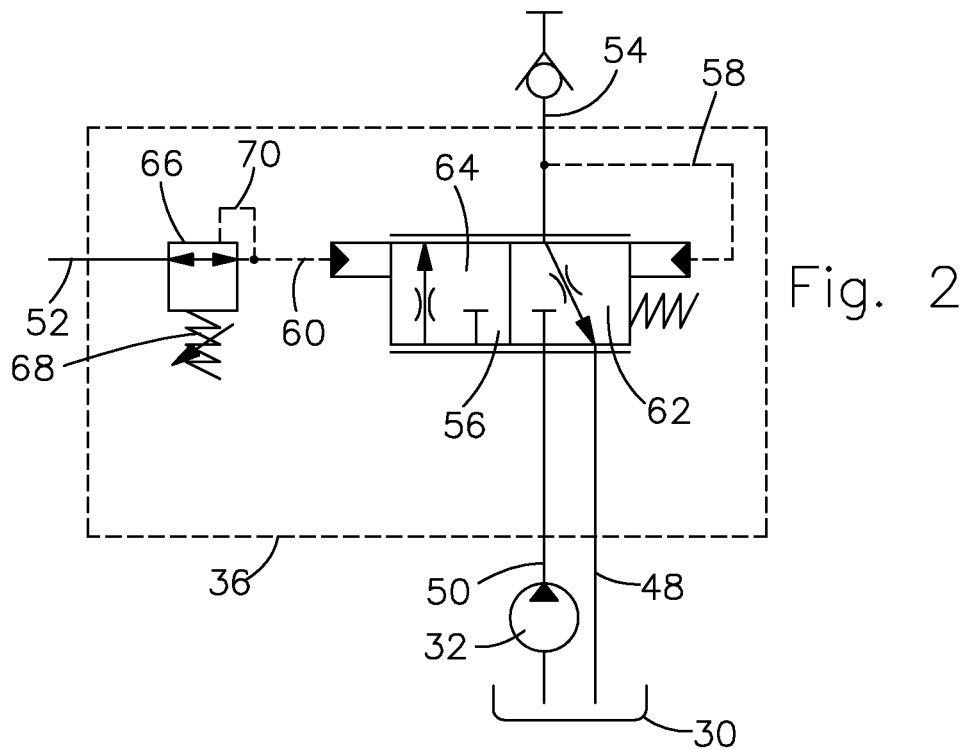
FIG. 2 shows a hydraulic circuit diagram of a hydraulic arrangement according to the invention with manual adjustment of a pressure-reducing valve.

FIG. 2 shows a first exemplary embodiment of the hydraulic control 36 for the trailer 12. The hydraulic control 36 has connecting lines 48, 50 which connect the hydraulic control 36 to the hydraulic tank 30 and the hydraulic pump 32. Furthermore, a hydraulic line 52 is provided, which makes a connection to the hydraulic control 34 for the traction vehicle 10 or to the brake system 14 of the traction vehicle 10. A brake line 54 connects the hydraulic control 36 to the hydraulic coupling point 46 of the traction vehicle 10. The hydraulic control 36 comprises, furthermore, a trailer brake valve 56 which is arranged between the connecting lines 48, 50 and the brake line 54. The trailer brake valve 56 is preferably designed as a hydraulically activatable proportional slide valve which can be activated hydraulically via a first control-pressure line 58 connected to the brake line 54 and via a second control-pressure line 60 connected to the hydraulic line 52. The position of the trailer brake valve 56 and therefore also the pressure in the brake line 54 consequently depend on the pressure differences prevailing at the trailer brake valve 56, between the first and the second control-pressure line 58, 60. The trailer brake valve 56 in a first end position 62, connects the hydraulic tank 30 to the brake line 54 and, in a second end position 64, connects the hydraulic pump 32 to the said brake line 54. Since the trailer brake valve 56 is designed as a proportionally activatable slide valve, any desired intermediate positions are possible in proportion to the control pressures acting on the trailer brake valve 56. The second control-pressure line 60 is provided with a pressure-reducing means in the form of a pressure-reducing valve 66, the hydraulic line 52 serving as a control-pressure source for the second control-pressure line 60. In this case, another component of the brake system 14 of the traction vehicle 10 may also serve as a control-pressure source, as long as this is connected indirectly or directly to the acted-upon brake pressure of the brake system 14. The pressure-reducing valve 66 serves for reducing or limiting the control pressure with which the second control-pressure line 60 is acted upon. The pressure-reducing valve 66 can be adjusted via a setting device designed as a manually adjustable prestressing spring 68 and is thereby forced mechanically into a presettable open basic position. A control pressure acting counter to the prestressing force of the prestressing spring 68 is applied via a third control-pressure line 70 connected to the second control-pressure line 60 and moves the pressure-reducing valve 66, counter to the prestressing force, in the direction of the closing position according to the magnitude of the control pressure. When the maximum control pressure is reached in the second control-pressure line 60, the pressure-reducing valve 66 is then closed, counter to the set prestressing force, via the third control-pressure line 70. Thus, by an appropriate presetting of the prestressing force, a maximum control pressure in the second control-pressure line 60 and consequently a maximum pressure for the brake line 54 of the trailer 12 are set. As mentioned, the setting of the maximum brake pressure for the trailer 12 takes place by the adjustment of the prestressing spring 68 of the pressure-reducing valve. As a result, the pilot pressure which displaces the trailer brake valve 58 can be set to a defined maximum pressure which, for example, does not undershoot 100 bar or 120 bar (in France) and does not overshoot 150 bar.

Figure 3:
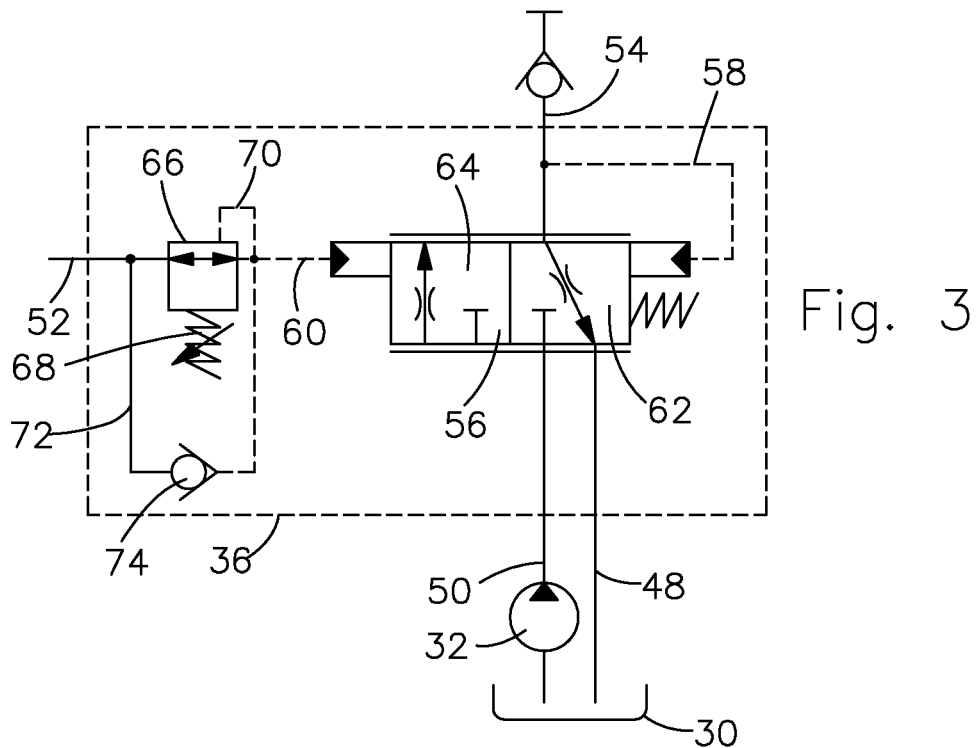
FIG. 3 shows a hydraulic circuit diagrams of a hydraulic arrangement according to the invention with manual adjustment of a pressure-reducing valve and bypass line.

FIG. 3 shows a further exemplary embodiment, in which, in addition to the exemplary embodiment illustrated in FIG. 2, a bypass line 72 is arranged, by means of which the pressure-reducing valve is bypassed and which extends between the hydraulic line 52 and the second control-pressure line 60. The bypass line 72 has a non-return valve 74 which closes in the direction of the second control pressure line 60. The non-return valve 74 makes it easier to have a backflow of the hydraulic fluid in the case of a decreasing brake pressure or control pressure in the second control-pressure line 60. Depending on the design of the pressure-reducing valve 66, this even simply makes possible a backflow of the hydraulic fluid.

Figure 4:
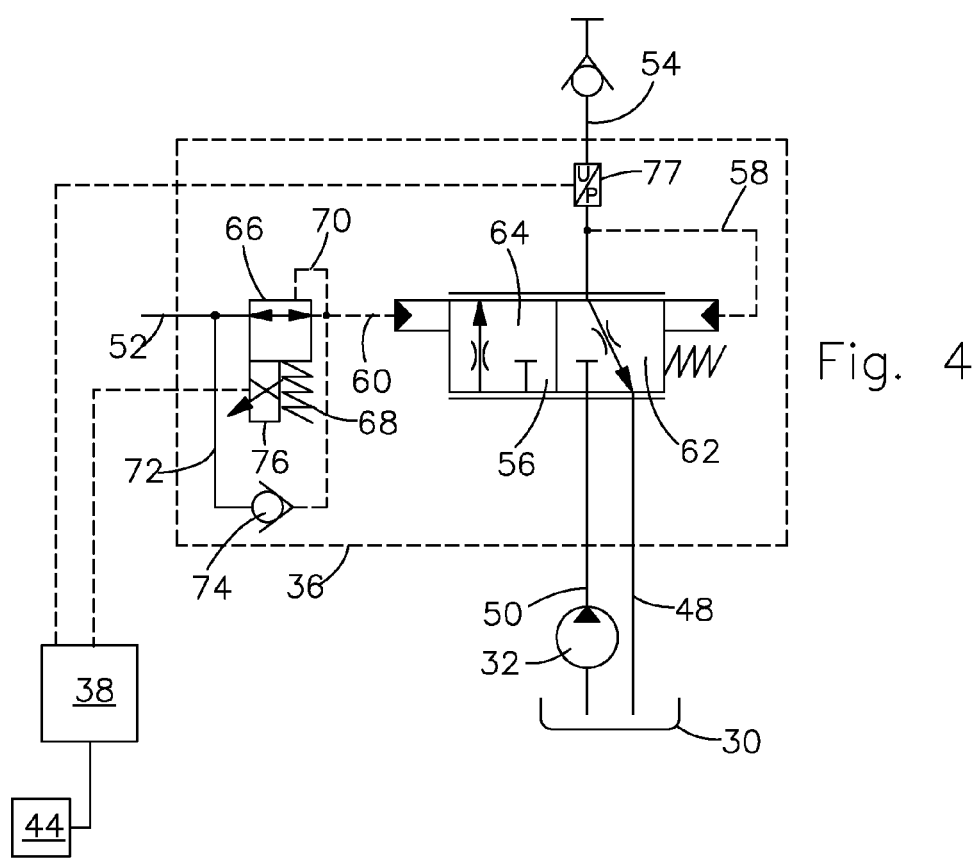
FIG. 4 shows a hydraulic circuit diagram of a hydraulic arrangement according to the invention with the electronic adjustment of a pressure-reducing valve and bypass line.

A further exemplary embodiment is illustrated in FIG. 4. An electronic adjustment device coming into interaction with the prestressing spring 68 allows the electronic adjustment of the pressure-reducing valve 66 or of the prestressing spring 68. By means of the adjustment device, the prestressing spring can be proportionally reinforced or relieved by electronic control. The adjustment device is preferably designed as an electronically activatable magnet coil 76 which can be adjusted via the electronic control 38. The adjustment of the magnet coil 76 or of the adjustment device takes place via the setting device 44 which is arranged in the vehicle cab 40 and via which corresponding control signals are sent to the electronic control 38. The adjustment device may also be designed as an electric motor or as another electronic adjustment device, by means of which the prestressing force acting on the pressure-reducing valve can be adjusted. The prestressing spring 68 must be set or designed such that, in the event of failure of the electronics, the regulations are, as before, fulfilled. Thus, the maximum trailer brake pressure, for example, should not undershoot 100 bar (120 bar in France) and not overshoot 150 bar. If the prestressing spring 68 is preset, for example, to 100 bar (120 bar in France), the prestressing spring 68 can be reinforced proportionally by up to 50 bar electronically according to the electronic signal predetermined by the setting device 44, in order to set a maximum pressure for the trailer brake valve 56 of 150 bar, and, with an increasing electronic signal, the prestressing force acting on the pressure-reducing valve 56 from the prestressing spring 68 and magnet coil 76 increases. If, by contrast, the prestressing spring 68 is preset to 150 bar, the prestressing spring 68 can be relieved proportionally by up to 50 bar electronically according to the electronic signal predetermined by the setting device 44, in order to set a maximum pressure for the trailer brake valve 56 of 150 bar, and, with an increasing electronic signal, the prestressing force acting on the pressure-reducing valve 56 from the prestressing spring 68 and magnet coil 76 decreases (this not being illustrated here in the circuit logics in FIG. 4). In the event of a failure of the electrics, the trailer would still be capable of being braked, and the maximum pressure would amount either to 100 bar (120 bar in France) or to 150 bar. A pressure sensor 77 may be provided, which is arranged in the brake line 54 of the trailer 12, this generally not being absolutely necessary for the functioning of the hydraulic arrangement, although a more accurate setting or regulation of the trailer brake pressure via the electronic control unit 38 can be achieved. The advantage would be tantamount to a closed loop, in which the initial pressure of the hydraulic arrangement or the trailer brake pressure is monitored continuously and a closed-loop control provided is thereby improved.

Figure 5:
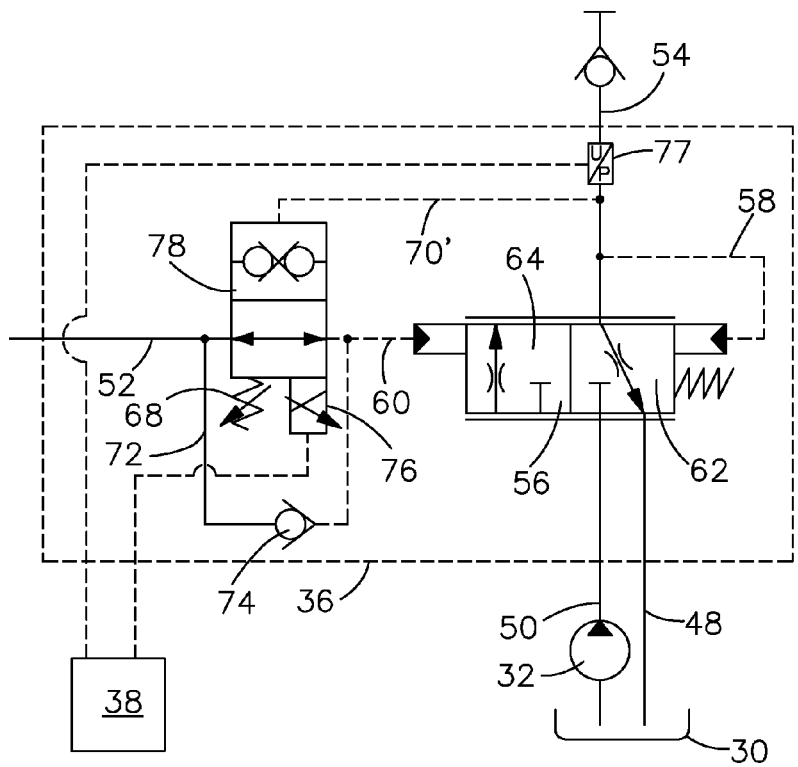
FIG. 5 shows a hydraulic circuit diagram of a hydraulic arrangement according to the invention with electronic adjustment of a switching valve and bypass line.
Figure 6:
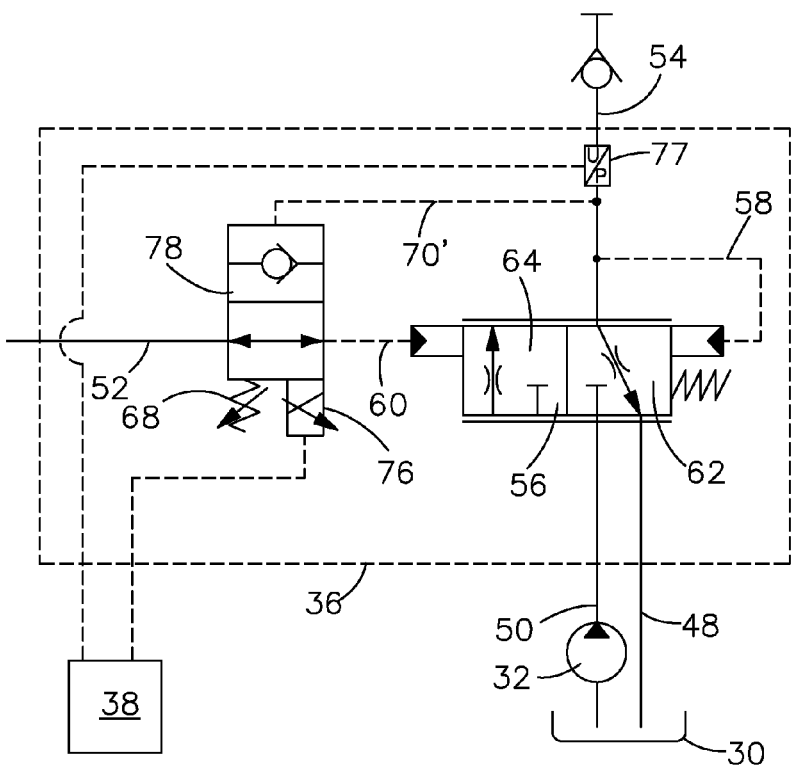
FIG. 6 shows a hydraulic circuit diagram of a hydraulic arrangement according to the invention with electronic adjustment of a switching valve without bypass line.

FIGS. 5 and 6 show in each case a further exemplary embodiment, a switching valve 78 being arranged instead of the pressure-reducing valve 66 from FIGS. 2 to 4. The switching valve 78 has a closing position and a passage position, here, too, the passage position being preset by the prestressing spring 68. Similarly to the exemplary embodiment from FIG. 4, the prestressing force here, too, may be adjusted electronically by means of an electronic adjustment device in the form of a magnet coil 76. According to FIGS. 5 and 6, this version may be implemented with or without a bypass line 72, in the exemplary embodiment (without bypass line 72) illustrated in FIG. 6 the switching valve 78, in the closing position, allowing a return of the hydraulic control-pressure fluid in the direction of the brake system 14 of the traction vehicle 10, this being ensured, in the exemplary embodiment illustrated in FIG. 5, by a separate non-return valve 74 arranged in the bypass line 72. Contrary to the exemplary embodiments in FIGS. 2 to 4, the switching valve 78 in FIGS. 5 and 6 is connected to the brake line 54 for the trailer 12 via a third control-pressure line 70'. What is thus achieved is that, beyond a defined pressure in the brake line or beyond a maximum pressure, the switching valve 78 is brought into the closing position automatically by pressure control. In this case, as also in the exemplary embodiments previously, the maximum pressure is predetermined by the presettable prestressing force. Thus, it is not the control pressure acting on the trailer brake valve 56 which is the control signal for the pressure-reducing means, as in the exemplary embodiments previously (FIGS. 2 to 4), but, instead, the brake pressure braking the trailer 12 and acting in the brake line 54. As already mentioned, here, too, the electronics may have a reinforcing or reducing effect on the prestressing force of the switching valve, so that, in the event of a failure of the electronics, the trailer can be braked, for example, with max. 100 bar (or 120 bar in France) or 150 bar. Optionally, here, too, as already in the exemplary embodiment described in FIG. 4, a pressure sensor 77 may be provided, which is arranged in the brake line 54 of the trailer 12.

Figure 9:
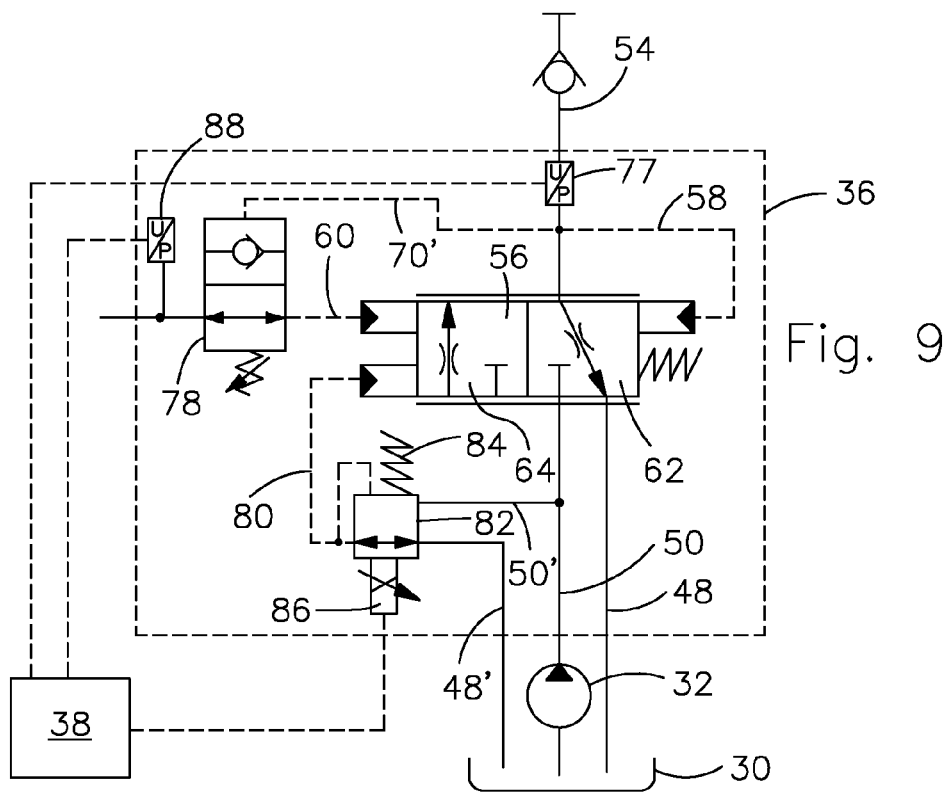
FIG. 9 shows, a hydraulic circuit diagram of a hydraulic arrangement according to the invention with manual adjustment of a switching valve without bypass line and with an additional control-pressure line and pressure sensor.
Figure 10:
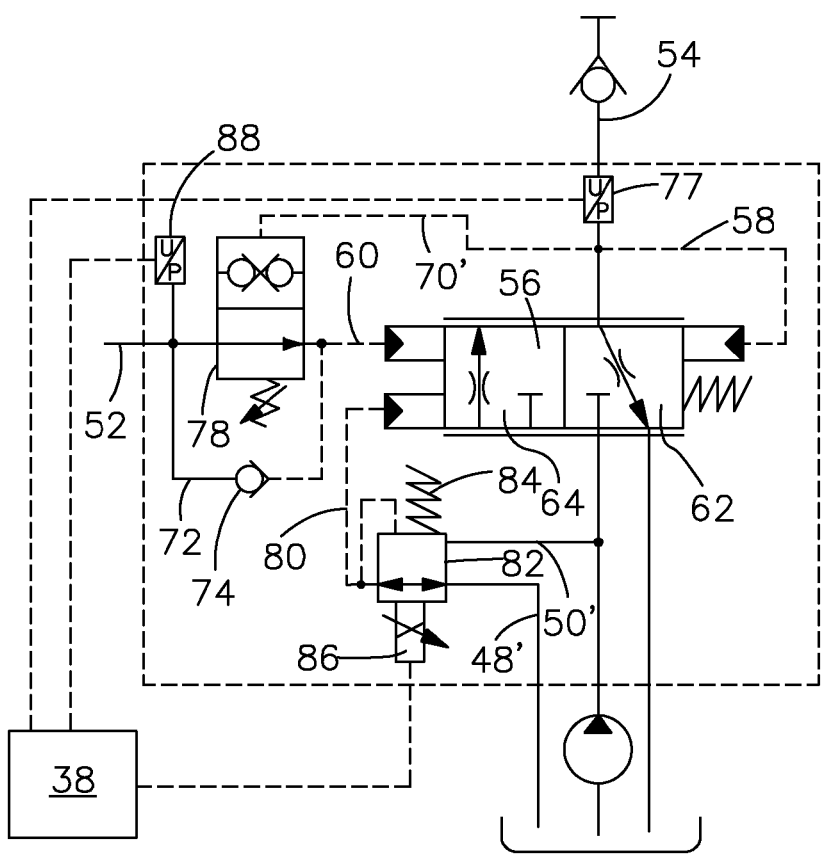
FIG. 10 shows a hydraulic circuit diagram of a hydraulic arrangement according to the invention with manual adjustment of a switching valve with bypass line and with an additional control-pressure line and pressure sensor.
Figure 11:
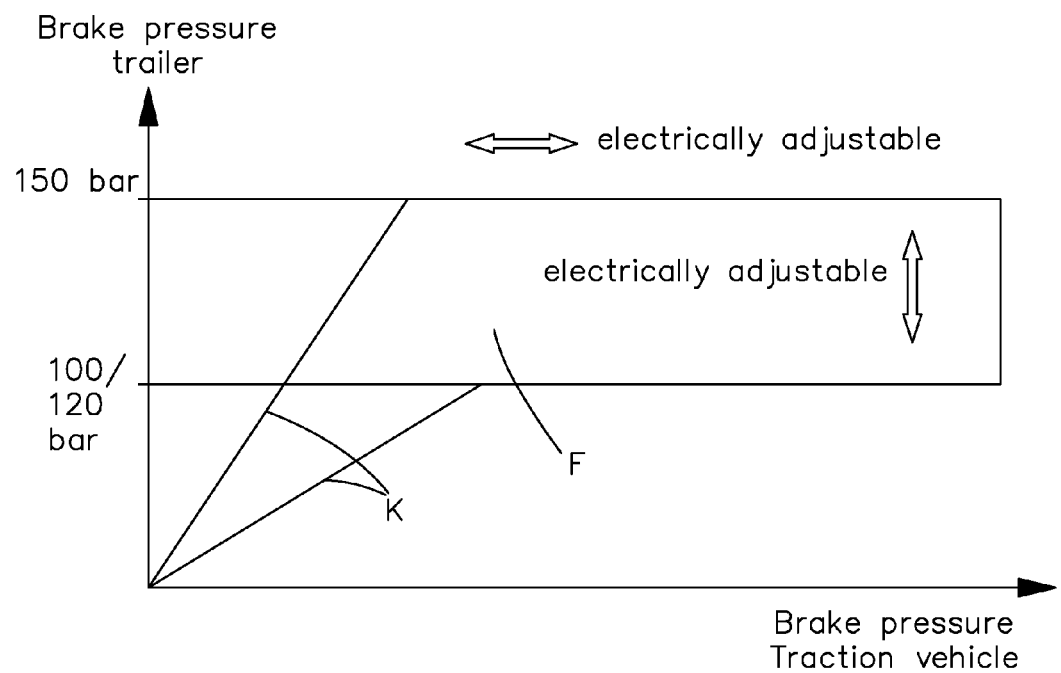
FIG. 11 shows a graph of a characteristic map for a trailer brake valve with a variable characteristic curve.

Further exemplary embodiments are illustrated in FIGS. 7 to 10 which differ from the exemplary embodiments of FIGS. 2 to 6 essentially in that the trailer brake valve 56 can additionally be activated via a further control-pressure line 80 parallel to the second control-pressure line 70, so that a characteristic curve K of the trailer brake valve 56 can be adjusted in a flexible way, that is to say in order to reinforce or weaken the response behavior of the trailer brake valve 56 (see FIG. 11). In the present case, a reinforced response behavior of a trailer brake valve 56 means that, as compared with the preceding exemplary embodiments, with the brake pressure in the brake system 14 of the traction vehicle 10 being the same, a higher brake pressure is achieved in the brake line 54 for the trailer 12. Graphically, this means an increase in the gradient of the characteristic curve K of the trailer brake valve 56 (see FIG. 11, steeper characteristic curve K). The trailer brake valve 56 is thus controlled by a first control pressure, which is acted upon on a first side of the trailer brake valve 56 by the first control-pressure line 58, and by a second and a third (parallel-acting) control pressure which is acted upon in each case on the opposite second side of the trailer brake valve 36 by the second and the further control-pressure line 60, 80.

As illustrated in FIGS. 7 to 10, an electronically activatable electroproportional pressure-reducing valve 82 is arranged, which connects the further control-pressure line 80 both to the hydraulic tank 30 via a line 48' and to the hydraulic pump 32 via a line 50'. Thus, via the further control-pressure line 80 in conjunction with the electroproportional pressure-reducing valve 82, the control pressure applied overall can be increased on the second side of the trailer brake valve 56, in order to reinforce the response, behavior of the trailer brake valve 56 or in order to configure the gradient of the characteristic curve K of the trailer brake valve 56 variably (flexibly), so as thus to map for the trailer brake valve 56 a characteristic map F comprising various characteristic curves K (see FIG. 11). The electroproportional pressure-reducing valve 82 has a prestressing spring 84 and an electronic adjustment device 86, for example an electromagnetic coil, which counteracts the prestressing spring 84. The prestressing spring 84 holds the pressure-reducing valve 82 in a basic position in which no control pressure is built up from the hydraulic pump 32 in the further control-pressure line 80. By means of control signals generated by the electronic control 38, the electroproportional pressure-reducing valve 82 can be adjusted proportionally to the control signals, so that an additional control pressure for the trailer brake valve 56 can be built up.

Figure 7:
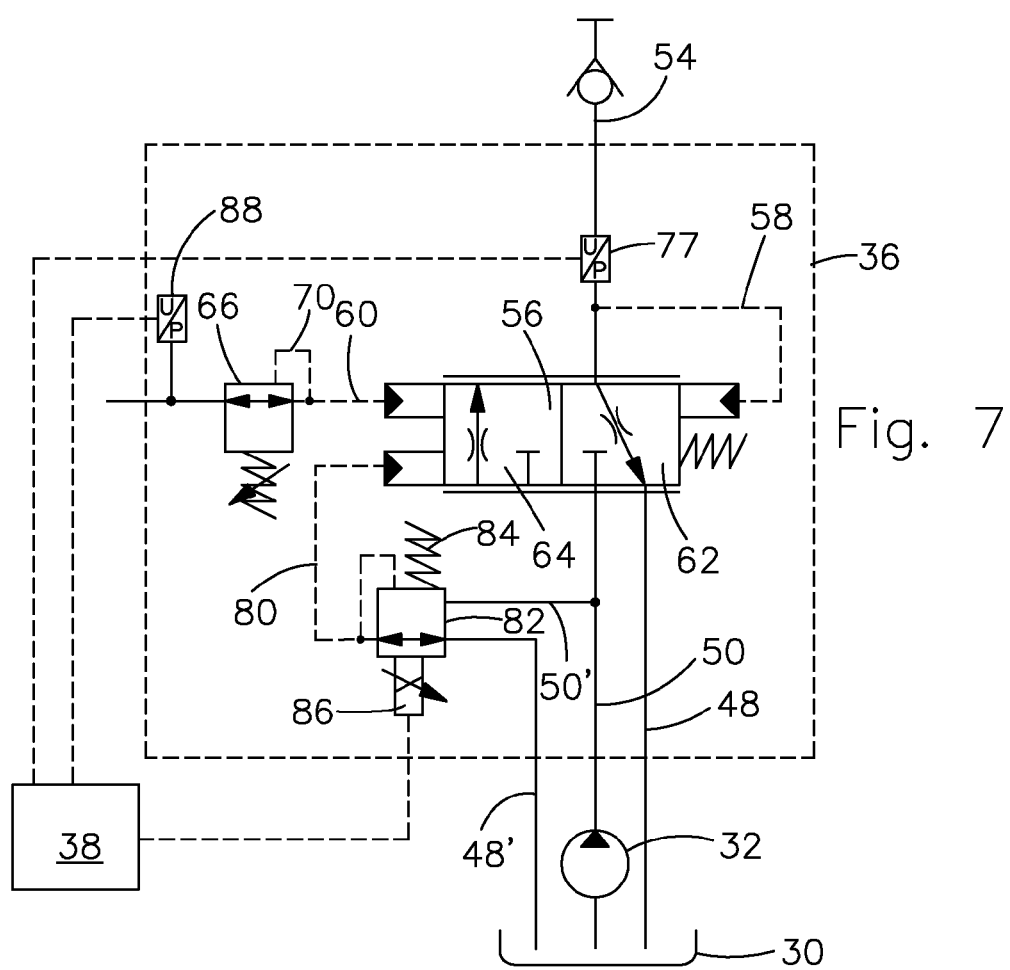
FIG. 7 shows a hydraulic circuit diagram of a hydraulic arrangement according to the invention with manual adjustment of a pressure-reducing valve without bypass line and with an additional control-pressure line and pressure sensor.
Figure 8:
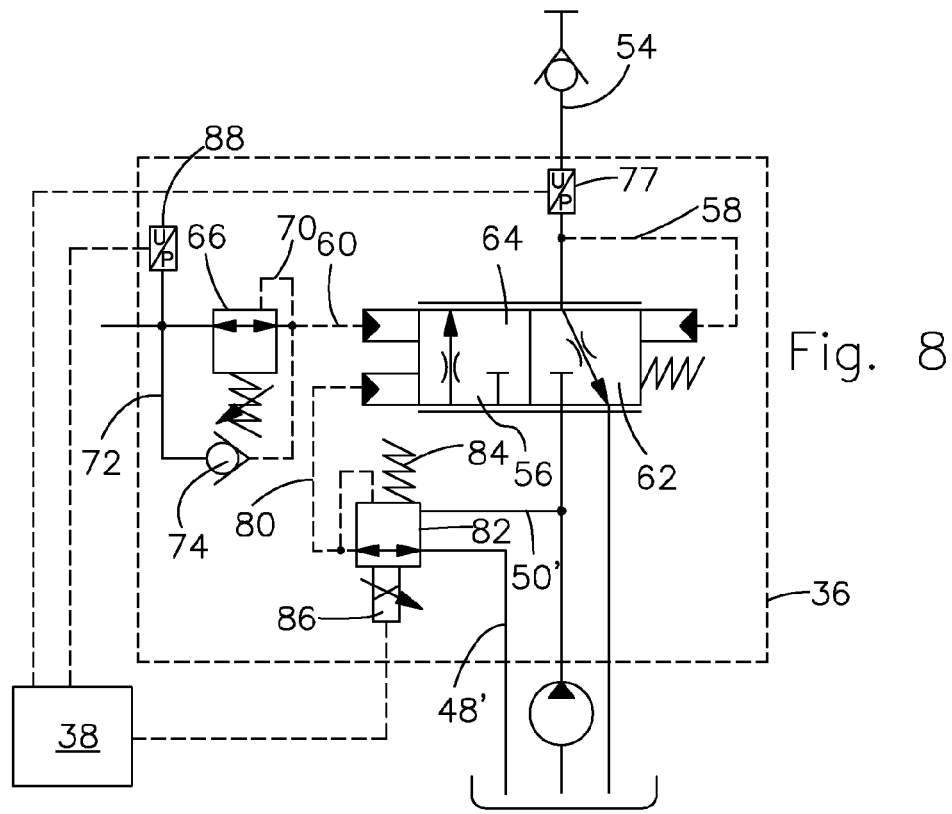
FIG. 8 shows a hydraulic circuit diagram of a hydraulic arrangement according to the invention with manual adjustment of a pressure-reducing valve with bypass line and with an additional control-pressure line and pressure sensor.

The hydraulic circuit diagrams illustrated in FIGS. 7 and 8 and also 9 and 10 show two different versions of how a trailer brake valve 56 can be operated flexibly according to the above statements, the exemplary embodiments illustrated in FIGS. 7 and 8 having an adjustable pressure-reducing valve 66 which is arranged in the second control-pressure line 60 and is connected to the second control-pressure line 60 via a third control-pressure line 70, and the exemplary embodiments illustrated in FIGS. 9 and 10 having an adjustable switching valve 78 which is arranged in the second control-pressure line 60 and is connected to the brake line 54 for the trailer 12 via a third control-pressure line 70'. By means of the adjustable pressure-reducing valve 66 or the adjustable switching valve 78, the control pressure in the second control-pressure line 60 can be limited according to the statements relating to FIGS. 2 to 6. FIGS. 7 and 8 differ in that, similarly to the exemplary embodiments illustrated in FIGS. 2 and 3, the pressure-reducing valve 66 is designed, on the one hand, without and, on the other hand, with a bypass line 72 having a non-return valve 74 (FIG. 7 and FIG. 8). FIGS. 9 and 10 differ in that, similarly to the exemplary embodiments illustrated in FIGS. 5 and 6, the switching valve 78 is designed, on the one hand, without and, on the other hand, with a bypass line 72 having a non-return valve 74 (FIG. 9 and FIG. 10). Correspondingly, here too, a pressure reduction in the control-pressure line is ensured via a possibility of the return of the hydraulic control-pressure fluid in a closing position of the switching valve 78 (FIG. 9) or via a non-return valve 74 arranged separately in the bypass line 72 (FIG. 10).

In addition to the electroproportional pressure-reducing valve 82 already mentioned, arranged for the flexible activation of the trailer brake valve 56, in the exemplary embodiments of FIGS. 7 to 10 a pressure sensor 88 connected to the hydraulic line 52 serving as a control-pressure source is arranged, by means of which a pressure in the brake system 14 of the traction vehicle 10 can be detected. Both the pressure sensor 88 and the electroproportional pressure-reducing valve 82 or the adjustment device 86 are connected to the electronic control 38. Corresponding control signals for the electroproportional pressure-reducing valve 82 can be predetermined or generated by means of the setting device 44 in conjunction with the electronic control 38. A pressure sensor 77, which is arranged in the brake line 54 of the trailer 12, may also be provided in the exemplary embodiments according to FIGS. 7 to 10, as already in the exemplary embodiment described in FIG. 4.

A feature essential to all the exemplary embodiments illustrated in FIGS. 7 to 10 is that, first, the limitation of the maximum brake pressure for the trailer 12 takes place by the limitation of the control pressure in the second control-pressure line 60 via the adjustable pressure-reducing valve 66 or via the adjustable switching valve 78 in a similar way to the exemplary embodiments illustrated in FIGS. 2 to 6.

Starting from a permanently set control pressure in the second control-pressure line 60 for setting the prescribed maximum brake pressure for the trailer 12 (for example, 100 bar or 120 bar for France), a braking of the trailer 12 according to regulations can take place in the event of a failure of the electrics. It is important that this maximum brake pressure is permanently set and should not be adjustable (apart from the difference of 100 bar and 120 bar, which may be expedient for reasons of diversity of parts, so that one and the same pressure-reducing valve 66 satisfies, for example, the stipulations for 100 bar and for 120 bar). The braking characteristic or the characteristic curve K of the trailer brake valve 56 is designed or set in a basic setting such that, in the basic position of the electroproportional pressure-reducing valve 82, the vehicle combination (10, 12) can be braked in its most unfavorable state in terms of the French regulations, without the regulations being infringed (for example, lower characteristic curve K in FIG. 11). Another (higher or lower) gradient of the characteristic curve K of the trailer brake valve 56 may, of course, also be envisaged, but the vehicle should not be braked too aggressively, since this type of operation is required only in the event of the failure of the electrical supply.

The characteristic curve K which reproduces a lower gradient and a minimal maximum, pressure (lower characteristic curve in FIG. 11) reflects the braking behavior of the trailer, brake valve 56 in the event of a failure of the electronics. This basic setting of the control pressure for the trailer brake valve 56, then, has superposed on it a further control pressure which is generated by the electroproportional pressure-reducing valve 82 or the hydraulic supply line connected to it, to the hydraulic pump 32. For this purpose, the electronic control 38 evaluates the pressure, measured by the pressure sensor 88 illustrated, in the brake system 14 of the traction vehicle 10 and, with reference to the characteristic curve K predetermined by the operator via the setting device 44, calculates the pressure signal to be generated by the electroproportional pressure-reducing valve 82, whereupon an activation of the adjustment device 86 generated by the electronic control 38 takes place. This leads, starting from the basic position of the electroproportional pressure-reducing valve 82, to a further deflection of the trailer brake valve 56 than would be possible only by means of the brake signal of the traction vehicle 10, and, consequently, to a steeper characteristic curve K of the trailer brake valve 56. Starting from a steeper characteristic curve K, conversely, a return to a flatter characteristic curve K may also take place. In the event of a failure of the electronics, the basic position of the electroproportional pressure-reducing valve 82 and the basic setting of the characteristic curve are set up automatically.

It is thus possible to vary the characteristic map F freely within predetermined limits (upper and lower characteristic curves K) and thus to set the braking behavior of the entire vehicle combination (traction vehicle 10 and trailer 12) positively in terms of the driving behavior. It is therefore also conceivable to store in the electronic control a specific intelligence which for example, with reference to the rate of pressure rise in the traction vehicle 10, detects whether there is emergency braking, so as then to brake the trailer 12 substantially more quickly and more strongly than normal.

Even though the invention has been described solely in terms of one exemplary embodiment, a person skilled in the art is afforded many different alternatives, modifications and variants, which come under the present inventions, in light of the above description and of the drawing.

The invention claimed is:

1. In a hydraulic arrangement, for use in a traction vehicle and trailer combination for controlling braking systems of each of said vehicle and trailer, including a source of pressurized hydraulic fluid, a tank, a trailer brake line coupled to said trailer braking system, a hydraulically activatable trailer brake valve connected to said source, tank and trailer brake line for selectively coupling said brake line either to said tank or to said source of pressurized fluid, a first control-pressure line coupled between said brake line and said brake valve for establishing a first control pressure at a first end of said brake valve, a control-pressure source, a second control-pressure line coupled between said brake valve and said control-pressure source for establishing a second control pressure at a second end of said brake valve, and an adjustable pressure-reducing valve arranged in said second control pressure line for controlling the second control pressure established in said second control pressure line, the improvement comprising: said control-pressure source being a control pressure used in said vehicle braking system; and said pressure-reducing valve including an adjustable prestressing force working in opposition to said second control pressure so as to place said pressure-reducing valve in a normally open position when said prestressing force exceeds said second control pressure.

2. The hydraulic arrangement, as defined in claim 1, wherein a bypass line is coupled to said second control-pressure line so as to bypass said pressure-reducing valve; and a non-return valve being located in said bypass line so as to be in parallel with said pressure-reducing valve.

3. The hydraulic arrangement, as defined in claim 1, wherein said pressure-reducing valve is hydraulically activatable; and a third pressure-control line being coupled between said second pressure-control line and said pressure-reducing valve for causing the latter to close the second control-pressure line when a pressure beyond a defined control pressure exists in said second control-pressure line.

4. The hydraulic arrangement, as defined in claim 1, wherein said pressure-reducing valve has an adjustable prestressing spring, by means of which a prestressing force can be generated which forces the pressure-reducing valve into said normally open position.

5. The hydraulic arrangement, as defined in claim 4, wherein said pressure-reducing valve includes an electronic adjustment device which operates in response to an electrical control signal for either counteracting or for reinforcing the prestressing force of said prestressing spring.

6. The hydraulic arrangement, as defined in claim 5 and further including an electronic controller coupled to said electronic adjustment device for generating and sending said control signal to said electrical adjustment device; and a setting device coupled to said electronic controller for providing an input for causing said electronic controller to send a preset control signal to said electronic adjustment device.

7. The hydraulic arrangement, as defined in claim 6, and further including a pressure sensor coupled to said trailer brake line and to said electronic controller for sending an electrical pressure signal representing a sensed pressure in said brake line to said electronic controller, which causes said electronic controller to modify said preset control signal in accordance with a difference between a desired pressure at said trailer brake line
and said sensed pressure.

8. The hydraulic arrangement, as defined in claim 1, and including a further control-pressure line coupled to said second end of said trailer brake valve, by means of which a third control pressure may be conveyed to the trailer brake valve in addition to said first and second control pressures respectively conveyed to the trailer brake valve by said first and second control-pressure lines; an electronically adjustable pressure-reducing valve being connected to said further control-pressure line and to said hydraulic pressure source and said hydraulic tank, with said electronically adjustable pressure reducing valve being selectively shiftable between an un-activated position wherein it connects said further control-pressure line to said hydraulic tank, and an activated position wherein it connects said further control-pressure line to said hydraulic pressure source; and an electronic control device being coupled for selectively sending a control signal to said electronically adjustable pressure reducing valve.

9. The hydraulic arrangement, as defined in claim 8, and further including a first pressure sensor coupled to said trailer brake line and to said electronic control for sending a first electrical pressure signal to said electronic control representing a first sensed pressure in said trailer brake line; a second pressure sensor coupled to said control pressure source used in said tractor brake system and to said electronic control for sending a second electrical signal to said electronic control representing a second sensed pressure existing at said control pressure source used in said tractor brake system, whereby said electronic control device uses said first and second electrical signals in generating said control signal, which is sent to said electronically adjustable pressure reducing valve.

10. The hydraulic arrangement, as defined in claim 1, wherein said brake valve is a proportional slide valve.

\* \* \* \* \*